(12) United States Patent
Hunter et al.

(10) Patent No.: US 7,433,888 B2
(45) Date of Patent: Oct. 7, 2008

(54) SCHEMA PACKAGING, DISTRIBUTION AND AVAILABILITY

(75) Inventors: Jason T. Hunter, Redmond, WA (US); David J. Nettleton, Seattle, WA (US); Song Xue, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 11/287,076

(22) Filed: Nov. 23, 2005

(65) Prior Publication Data

US 2007/0050404 A1 Mar. 1, 2007

Related U.S. Application Data (60) Provisional application No. 60/711,246, filed on Aug. 25, 2005.

(51) Int. Cl.
*G06F 7/00* (2006.01)
*H04L 9/00* (2006.01)

(52) U.S. Cl. ........................ 707/103; 713/168

(58) Field of Classification Search .................. 707/102, 707/103 R
See application file for complete search history.

(56) References Cited

U.S. PATENT DOCUMENTS

2002/0131428 A1* 9/2002 Pecus et al. ................. 370/401
2003/0200149 A1* 10/2003 Gonzalez et al. ............... 705/26
2004/0151308 A1* 8/2004 Kacker et al. ................. 380/30
2005/0149729 A1* 7/2005 Zimmer et al. ............... 713/168
2006/0031757 A9* 2/2006 Vincent, III .................. 715/513

OTHER PUBLICATIONS www.ondotnet.com/pub/a/dotnet/2002/10/14/local2.htm?page=2, by Satya Komatineni.*
Namje, et al. "Certificate Validation Service using XKMS for Computation Grid". ACM workshop on XML Security 2003, Washington DC, USA. 9 pages.
International Search Report dated Oct. 12, 2007 for PCT Application Serial No. PCT/US06/28386, 4 Pages.

* cited by examiner

*Primary Examiner*—Apu Mofiz
*Assistant Examiner*—Cindy Nguyen
(74) *Attorney, Agent, or Firm*—Amin, Turocy & Calvin, LLP (57) ABSTRACT

A system and/or methodology that enables schema packaging, distribution and availability. Aspects of the invention employ signing technology to facilitate secure definition of a schema package. The system and/or methodology can also include the schema package as a resource in a client-side assembly thereby guaranteeing that exactly the same infrastructure used to discover the assembly will be leverageable in discovery of the schema package(s). Other aspects can include the schema package as a satellite assemble or as a separate file. In these scenarios, the invention can facilitate constructing and distributing the schema package and information necessary to enable the client to interact with the store with regard to uninstalled schemas.

20 Claims, 9 Drawing Sheets

SCHEMA PACKAGING, DISTRIBUTION AND AVAILABILITY

CROSS-REFERENCE TO RELATED APPLICATIONS

This application claims the benefit of U.S. Provisional Patent application Ser. No. 60/711,246 entitled "SCHEMA PACKAGING, DISTRIBUTION AND AVAILABILITY" and filed Aug. 25, 2005. This application is related to pending U.S. patent application Ser. No. 11/167,350 entitled "SCHEMA SIGNING AND JUST-IN-TIME INSTALLATION" filed on Jun. 27, 2005. The entireties of the above-noted applications are incorporated by reference herein.

BACKGROUND

Technological advances in computing systems have been directed toward increasing the commonality of data thus enabling sharing, compatibility and interoperability between machines. For example, as is well known, frequently, a user may have data on one device and desire to share the data with a different device and/or application. Today, so long as the systems are pre-configured to accept specific data formats and types, computers can share data between applications and users. However, these conventional systems are not extensible. In other words, if the correct schema is not available on the destination device, the data cannot be transferred. As well, in order to maintain free data exchange, a user cannot add or modify types at an origination location (e.g., client/server) without the same additions and/or modifications being installed at the destination location (e.g., server/client). In other words, the destination location (e.g., server/client) must be equipped (e.g., maintain necessary schema information) to accept incoming data from a disparate device and/or application.

Developments in computing systems have been directed to employing a platform that utilizes the benefits of database technology. Oftentimes, these developments incorporate these benefits into the file system. However, these systems share the same schema compatibility drawbacks described above. As such, today, in order to effectively transfer and share data, the data in the file system must conform to a predefined common schema(s). Of course, a schema can be defined as a declarative way of describing the form (e.g., structure) of the data.

In emerging file systems, objects can be stored in the database (e.g., file system) and, accordingly, can be described by an applicable schema. Data in these file systems is an instance of specific schemas and types; the types are defined in the schema which defines the shape (e.g., structure) of the data. If a new type is desired to be added to the system, e.g., a new set of objects or a new form of data the system can work with, the developer would need to create a schema and a type within it. Next, properties would be added to the type.

A number of scenarios exist in which data has to be saved to a file system store (or other database) for which the required schema(s)/type(s) are not already installed. This is known as the "store down-level" problem. In conventional systems, only system administrators and/or persons with specialized authorizations could install schema information.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention described herein, in one aspect thereof, can facilitate inclusion of a schema package as a resource in the client-side assembly. Other aspects can include the schema package as a satellite assemble or as a separate file. It is to be understood that a schema definition can be collected in a document called a schema package. In exemplary scenarios, the system can facilitate constructing and distributing the schema package and information necessary to enable the client to interact with the store with regard to uninstalled schemas.

In order to support just-in-time installation of a schema, a signed schema package can be presented to a store for installation. Although the schema package offers a number of advantages, these advantages are negated if the package is not easily available for installation. The subject innovation, in an aspect thereof, is directed systems and methods to construct and distribute schema packages so as to ensure secure and on-time availability.

In accordance with an aspect, during the construction of a schema package, a strong name signing operation can be employed. Additional aspects can employ authenticode signing, compression and/or encryption of the schema package. The schema package can be included as a part of the client-side assembly that provides the implementation of the schema. The client-side assembly can be identified with a well-known name and can be available to the API in all places the schema can be used programmatically. In other words, whenever the client application instantiates an instance of a schematized type for persistence in a store, the client can have access to the schema package. In still another aspect, if the required schema is not available in the store, the Schema Package can be installed into the store prior to presenting the data.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
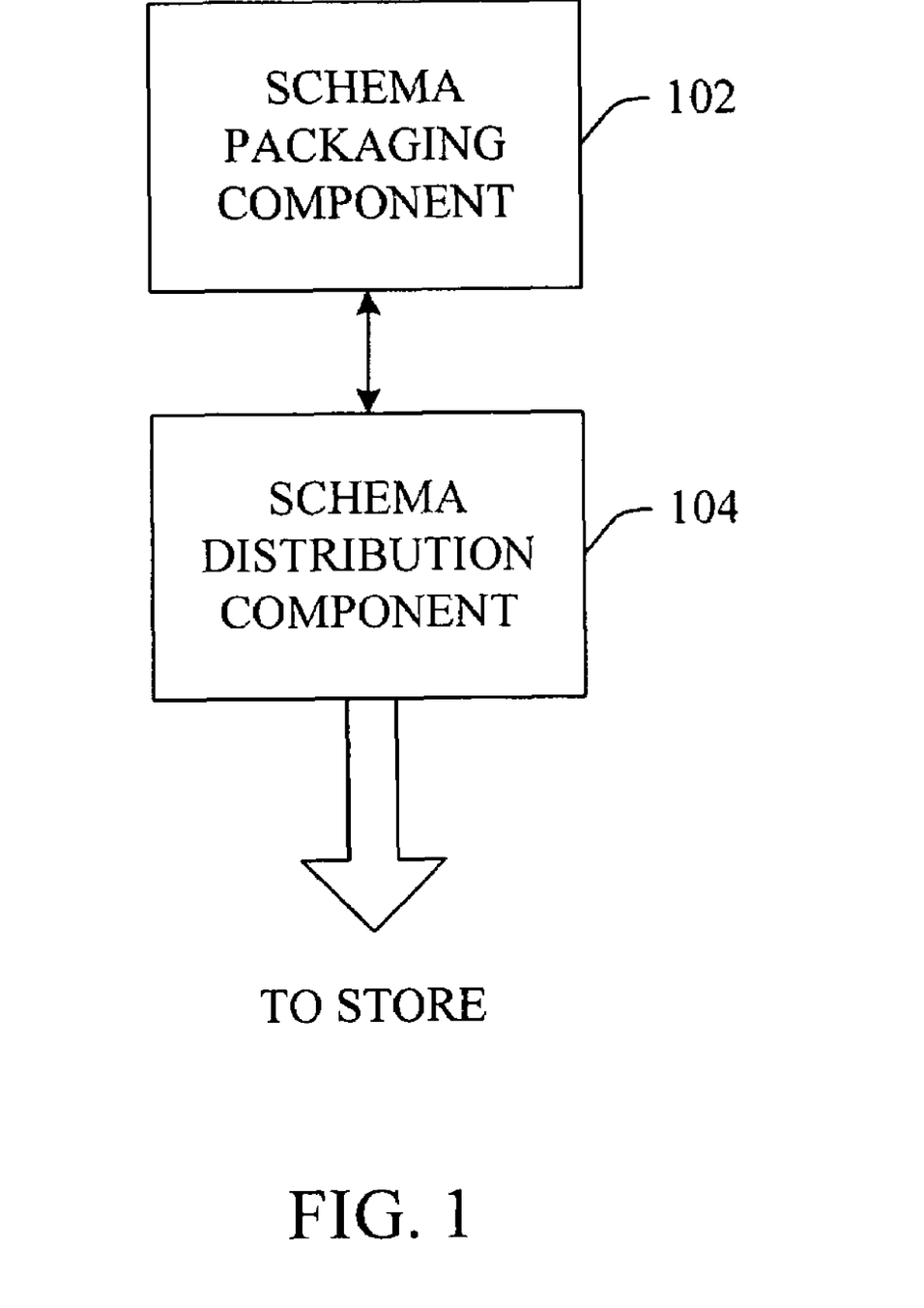
FIG. 1 is a block diagram of a system that facilitates packaging, distribution, and availability of a schema in accordance with an aspect of the invention.

Referring initially to FIG. 1, a system 100 that facilitates packaging, distribution and availability of a schema is shown. Generally, the system 100 can include a schema packaging component 102 and a schema distribution component 104. As described above, the system 100 can effect availability of an appropriate schema while maintaining security and reliability of the system 100.

Frequently, a user will have data on a computer and will want to share this data between applications and users. However, in some situations necessary information (e.g., schema) may not be available to effect the sharing of the data. There are a number of problems with the manner in which conventional systems effect the sharing of data. As described above, conventional systems are not extensible. For example, it is often difficult to add types due to permissions and accessibility problems. File systems often employ a platform that takes the benefits of a database and builds them into a storage file system. As such, the data in the file system can conform to a pre-defined and pre-installed schema—i.e., a declarative way of describing the form of the data.

In emerging file systems, objects are stored in the database (e.g., file system) and are described by a specialized schema. Data in these file systems is an instance of these schemas' types—the types are defined within the schema which defines the shape of the data. Although examples and aspects described herein are directed to database schema scenarios, it is to be understood that other scenarios and implementations of the novel functionality described herein exist whereby an applicable schema can describe other documents. These alternative aspects are intended to be included within the scope of this disclosure and claims appended hereto.

The subject innovation enables uninhibited transfer of data from one machine to another while enabling that, whenever the data arrives at the second machine, the metadata that is needed with regard to the data is already present at the second machine. Additionally, the innovation can coordinate schema information between components while maintaining the security with respect to the schema information.

Referring again to FIG. 1, aspects of the invention are directed to a system 100 (and/or methodology) that facilitates secure packaging, distribution and availability of a schema. In one aspect, a schema packaging component 102 can be provided to define a unit of schema installation—a schema package or just package (e.g., schema document) that describes the structure of the data. One issue that can be addressed by the system 100 is that if two schemas are developed independently, it is important to make sure that the schemas do not accidentally collide. In other words, it is important to ensure that the two types of documents do not accidentally appear to the destination machine as the same document.

In order to support the just-in-time installation of a schema as described in the aforementioned related application, the schema packaging component 102 can generate a uniquely signed schema package that can be presented to the store for installation. The schema package offers a number of advantages, but these are negated if the package is not easily available for installation. The distribution component 104 can facilitate availability for installation. The novel functionality of both the schema packaging component 102 and the schema distribution component 104 will be described in greater detail infra.

Generally, the subject innovation, in one aspect thereof, is directed to giving non-administrators or non-authoritative agents the ability to inject a schema into a store in order to facilitate the storage of data into the store. More particularly, this innovation enables this scenario to the extent that the schema is authoritative with respect to its owner and that the schema does not collide with schemas generated by a different owner.

In accordance with the novel functionality described herein, if one user generates a schema, another user can employ the schema and can determine that the schema is authoritative with respect to the original owner. Moreover, the user can guarantee that, if the schema is injected into a store, it will not negatively impact a pre-existing schema or a schema generated by another user. It will be appreciated that another key novel concept is the relationship between the schema package and the client-side assembly. This relationship can make the schema package available at all times with respect to the client-side assembly.

The innovation combines a number of technologies in order to effectuate the novel authoritative and non-colliding functionality described supra. Aspects of the invention describe how the schema package is constructed and distributed so as to ensure its availability. As will be apparent from a discussion of the figures that follow, it is a novel feature of an aspect of the innovation that the cryptographically signed schema package can be linked to a client side assembly, for example, included as a resource within the client-side assembly.

Figure 2:
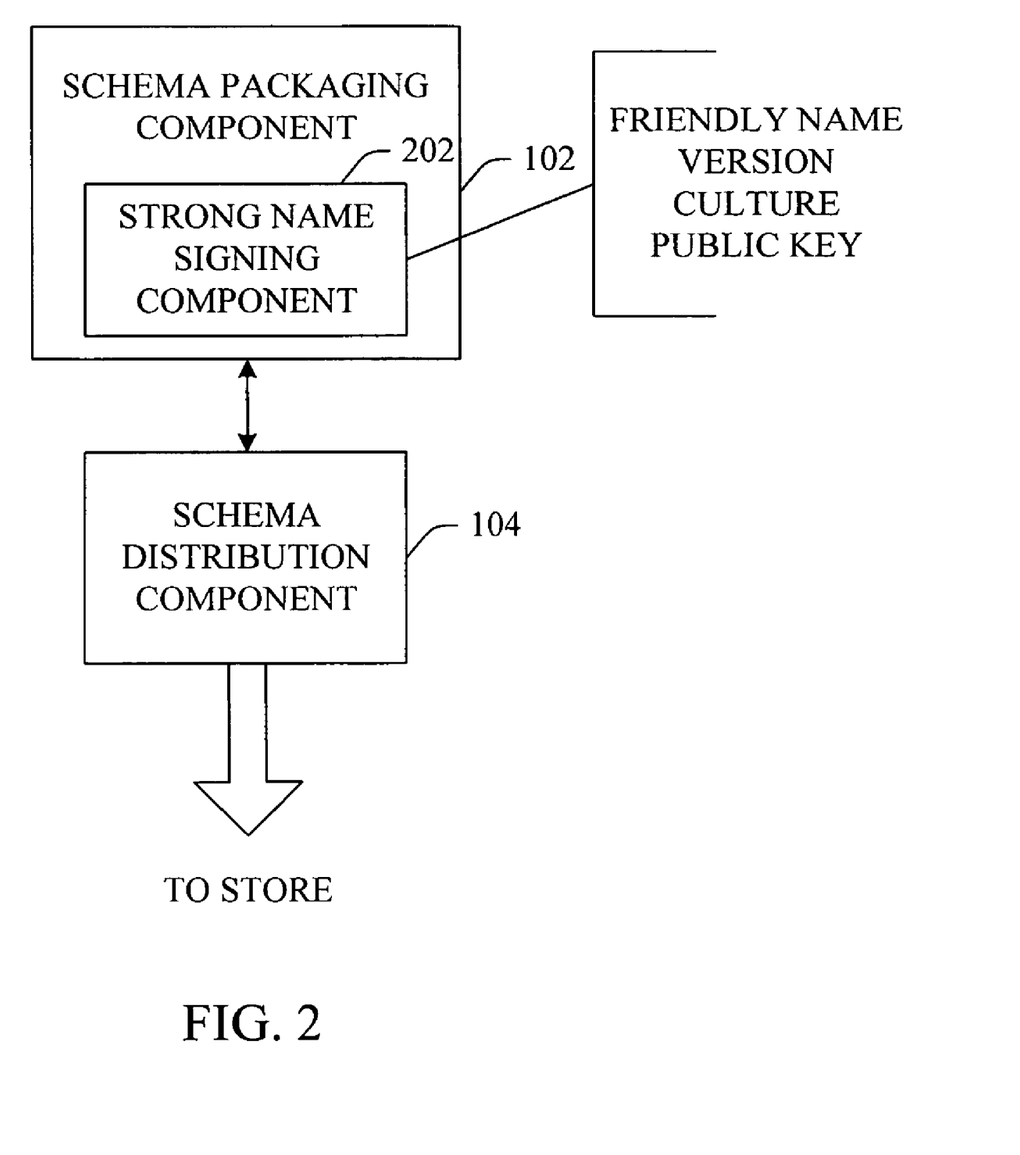
FIG. 2 illustrates a block diagram of a system that employs a strong name signing component to sign schema data in accordance with an aspect of the innovation.

Turning now to FIG. 2, an alternative architectural block diagram of system 100 is shown. In accordance with aspects of the novel schema packaging, distribution and availability system, construction of a schema package, via schema packaging component 102, can employ a strong name signing component 202 to effect a strong name signing operation. Strong name signing refers to the ability to define the schema uniquely from all other schemas, to provide a tampering check and to protect version lineage. Accordingly, with respect to strong name signing, each schema can have a unique name that is tightly coupled with the definition of the schema itself. Thus, the schema must be unique since any other schema will either have a different definition and/or signature.

Rather than transmitting a schema in its original form, a schema can be "packaged" by the schema packaging component 102 to give it a few desired characteristics while preserving its content. In one aspect, a schema package can be a schema definition language (SDL) document (e.g., extensible markup language (XML)) with a strong name. Further, it is to be understood that the schema package does not contain any custom or executable code. Accordingly, such a schema is the only unit of schema installation. As illustrated in FIG. 2, in one aspect, a strong name can include the schema's friendly name, version, culture and a public key portion of a cryptographic key pair used to sign the schema.

Figure 3:
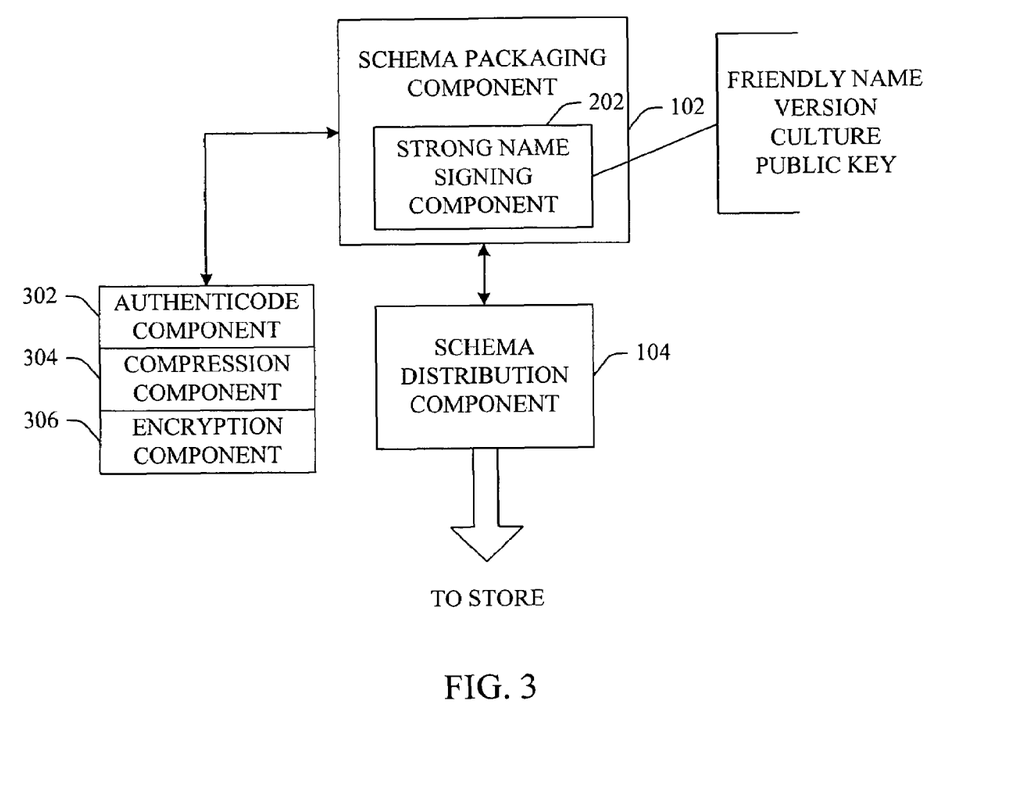
FIG. 3 illustrates an exemplary block diagram of a system that optionally employs authenticode, compression and/or encryption components in accordance with an aspect of the innovation.

Turning now to FIG. 3, an alternative system 300 that facilitates packaging, distribution and availability of a schema is shown. As shown, in addition to the strong name signing component 202, the schema packaging component 102 can optionally employ an authenticode component 302, a compression component 304, and/or an encryption component 306 as a part of the construction of a schema package. The authenticode signing component 302 can attach a particular strong name schema to a particular individual or set of individuals. Therefore, not only can this schema be authoritative with respect to its strong name, but, it can also authoritative with respect to its physical real person or organization author. Thus, the authenticode provider can guarantee a mapping between the strong name via the signature and the authenticode entity being the author of a schema.

The compression component 304 can make transportation easier and more efficient. For example, compression can be particularly useful when including a schema package in code that ships with a client that might communicate with a store, or ships with the data when data is taken out of a store for backup or for import/export operations, copy operations or synchronization. In all cases, when a schema is being attached to data, it can be particularly advantageous to compress the schema to reduce the overhead of transporting the schema with the data. This compression can be optionally effectuated via the compression component 304.

Moreover, encryption can be optionally employed via the encryption component 306. This encryption can facilitate security when a schema is being transferred with data. As there are cases when it is particularly useful to keep the schema proprietary, encryption mechanisms can be employed. Therefore, the schema definition will be hidden and not viewable in transit or at any other time at which the schema package may be inspected. The above discussion defines a schema package and sets forth the properties of a schema package in accordance with an aspect —where a package is a strong name signed schema including one or more of the above properties (e.g., authenticode, compression, encryption).

Once constructed, it is a novel feature of the subject invention to include the schema package as a part of (or to relate to) the client-side assembly that provides for an implementation of the schema. As well, the schema can be identified with a well-known name and available to an application program interface (API) in all places that the schema can be used programmatically.

It is to be understood that the above described system 300 ensures that whenever the client application instantiates an instance of a schematized type for persistence in a store, the client has access to the schema package. If the required schema is not currently available in the store then the schema package can be discovered and made available via the schema distribution component 104 and ultimately installed (e.g., via schema installation component as set forth in the aforementioned related application) into the store prior to presenting the data to the store.

In other words, the schema package can be included within (or linked to) the client-side assembly which is the application that that creates and/or manipulates data and communicates with the storage. In one particular aspect, the client-side assembly can include the definition of the schema as a resource. Alternatively, the schema can have another intrinsic relationship with the assembly thus effecting discoverability and availability.

Figure 4:
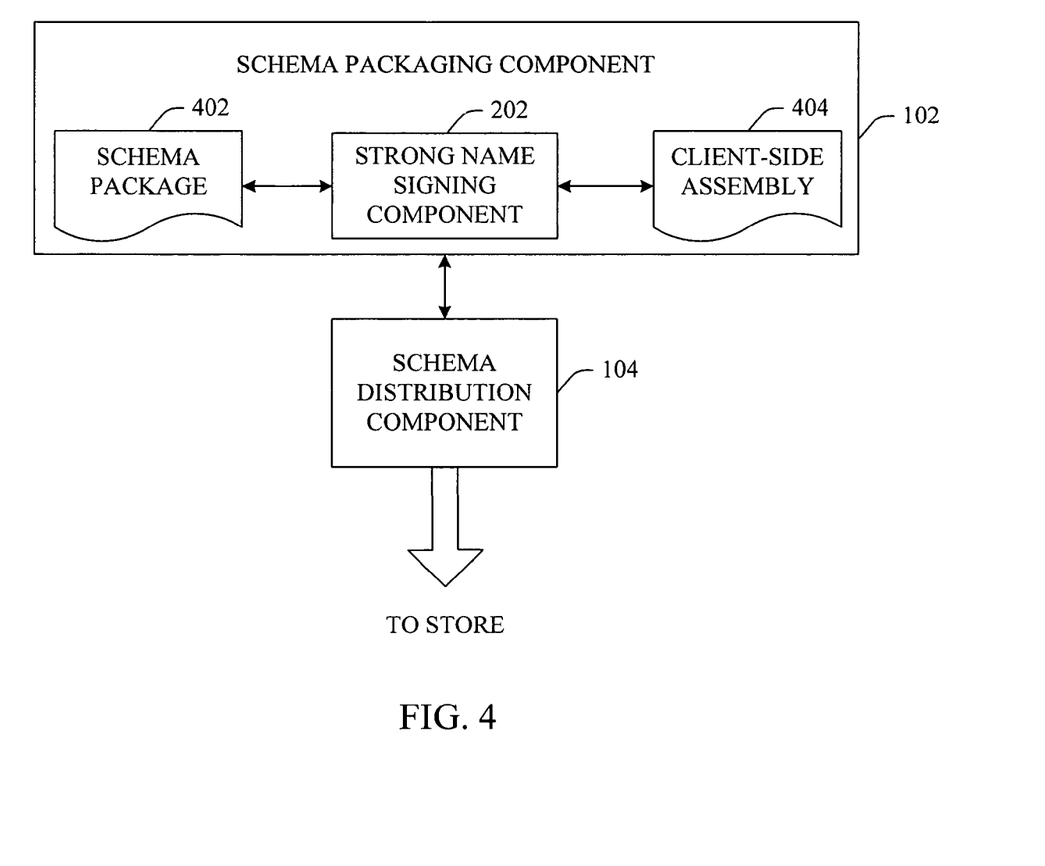
FIG. 4 illustrates a system that employs the same cryptographic signing of a schema package and a client-side assembly in accordance with an aspect of the innovation.

FIG. 4 illustrates yet another alternative system 400 that facilitates schema packaging, discovery and availability. In particular, FIG. 4 illustrates that a schema package 402 and a client-side assembly 404 can be signed by the same strong name signing component with the same strong name. It is to be appreciated that, to the extent that multiple schemas are needed to manipulate multiple types of data, these additional schema can also be included within (or associated with) the client-side assembly. Each package can be identified with a well-known name i.e., strong name that is generated upon signing the schema. Since the application itself must have the code in order to be running, in all places that the code is running, the schema package needed to communicate with the store must be there since whenever the code is available, the package is in the code as a resource.

Before an instance can be saved to a file system store, its schema (and that of all types in the instance's object tree) has to be present. As described above, in the case where the store is missing the schema, it needs to be installed. The subject schema packaging, distribution and availability can effect secure availability and/or installation of the required schema (s).

Figure 5:
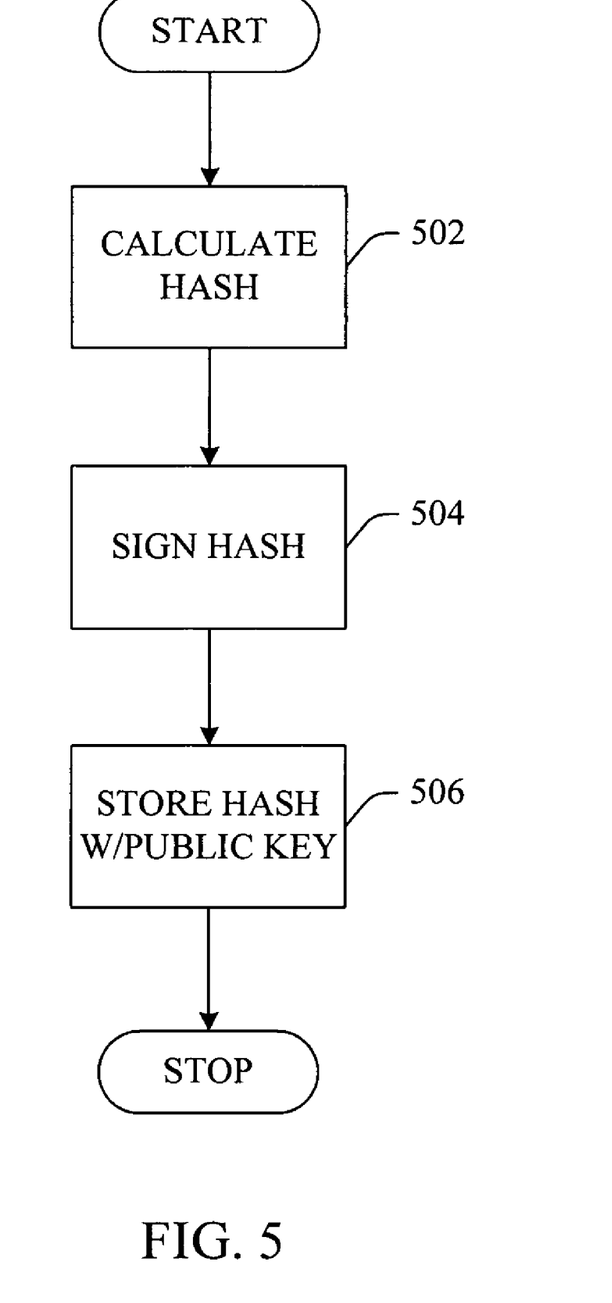
FIG. 5 illustrates an exemplary flow diagram of a methodology that effects strong name signing of a schema in accordance with an aspect of the invention.

Referring now to FIG. 5, a methodology of strong name signing a schema in accordance with an aspect of the invention is shown. While, for purposes of simplicity of explanation, the one or more methodologies shown herein, e.g., in the form of a flow chart or flow diagram, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

As illustrated in FIG. 5, in order to strong name sign a schema, at 502, the schema's hash value is calculated. In one example, a Secure Hash Algorithm (SHA1) hash can be employed. At 504, the hash value is then signed with an asymmetric cipher (e.g., RSA asymmetric cipher) using a private key. At 506, the signed hash value is stored in the schema together with the corresponding RSA public key.

Figure 6:
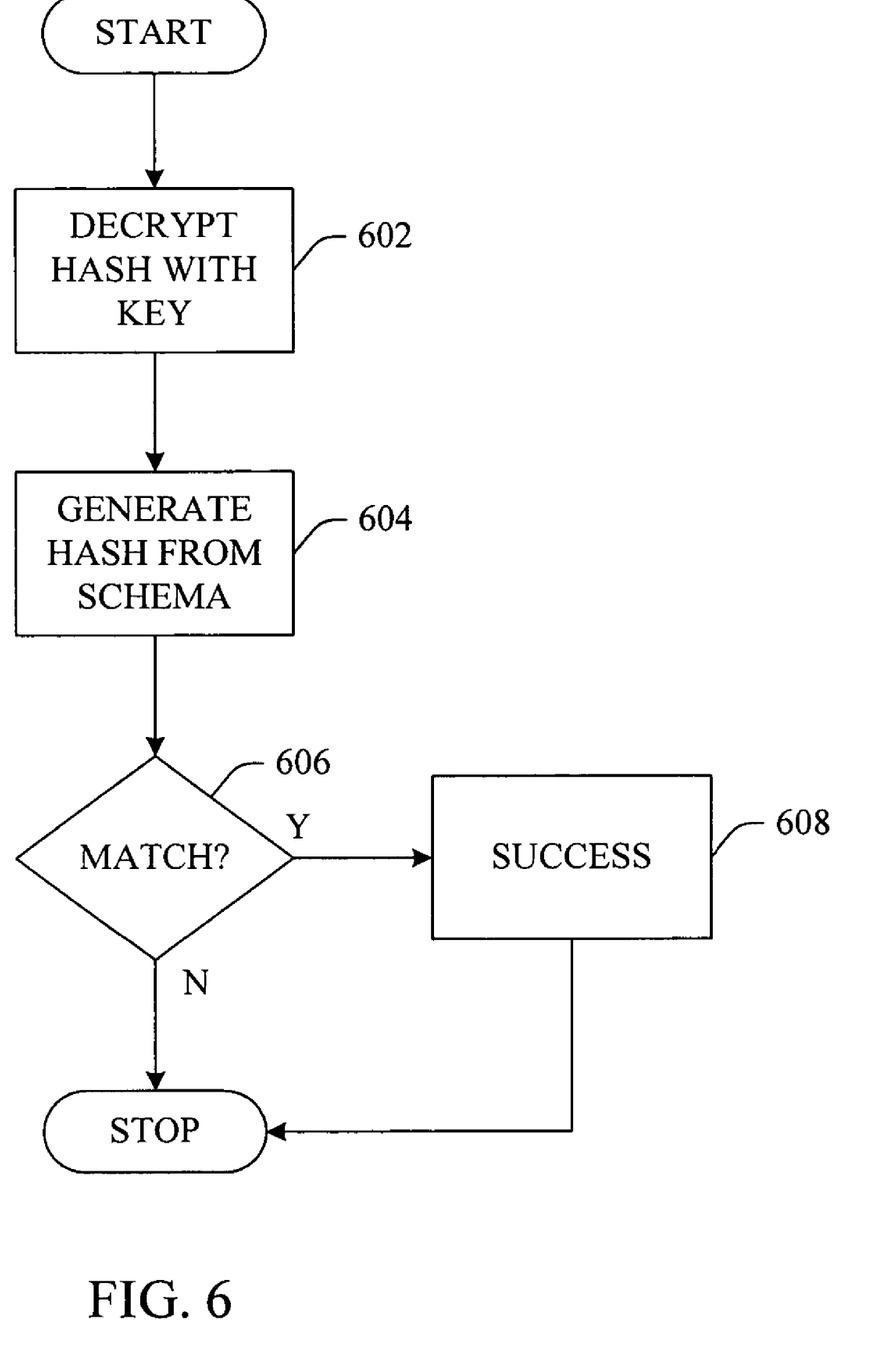
FIG. 6 illustrates an exemplary flow diagram of a methodology that effects decrypting a strong name signed schema in accordance with an aspect of the invention.

Referring now to FIG. 6, there is illustrated a methodology of verifying a strong named signed schema. In order to verify a strong name signed schema, at 602, the stored hash value is decrypted using the stored key (e.g., RSA key). Another hash value is independently generated from the schema content at 604. At 606, a determination is made if the two hash values match. If the two hash values do not match, a stop block is reached. If, on the other hand, if the two hash values match, the verification is deemed successful at 608.

A valid schema package can ensure the validity of the claimed strong name, the integrity of the content and a degree of publisher authenticity. In other words, the schema can be deemed authoritative with respect to the original owner. It will be appreciated that additional acts (e.g., in accordance with optional components of FIG. 3) can be applied during the packaging to achieve properties such as compactness (e.g., compression) and additional security (e.g., encryption and/or authenticode signing). These additional aspects are to be considered within the scope of this disclosure and claims appended hereto.

Together with the schema definition language, XML in this example, there can be a tool (not shown) that generates a file that can be compiled into a client-side assembly. This client-side assembly is the link to the classes defined in a specific type. In other words, the client-side assembly gives programmatic access to the classes.

Therefore, there can exist a very close relationship between the client side assembly and the schema package. In other words, the schema package can be readily available, if not included within the client-side assembly (e.g., as a resource). The client side assembly provides the implementation of programmatic access to view the data and the schema package or definition is the contract with the store. All in all, it is a novel feature of the innovation to provide an intrinsic relationship and/or linkage between the client side assembly (e.g., code) that implements the type and the schema package that describes the type within the store. A resource is one mechanism of effecting this relationship. In another aspect, the schema package can be stored in a static variable also compiled into the assembly or having it in another file and distributed side-by-side with the assembly or having it placed in another well-known location or cache.

Figure 7:
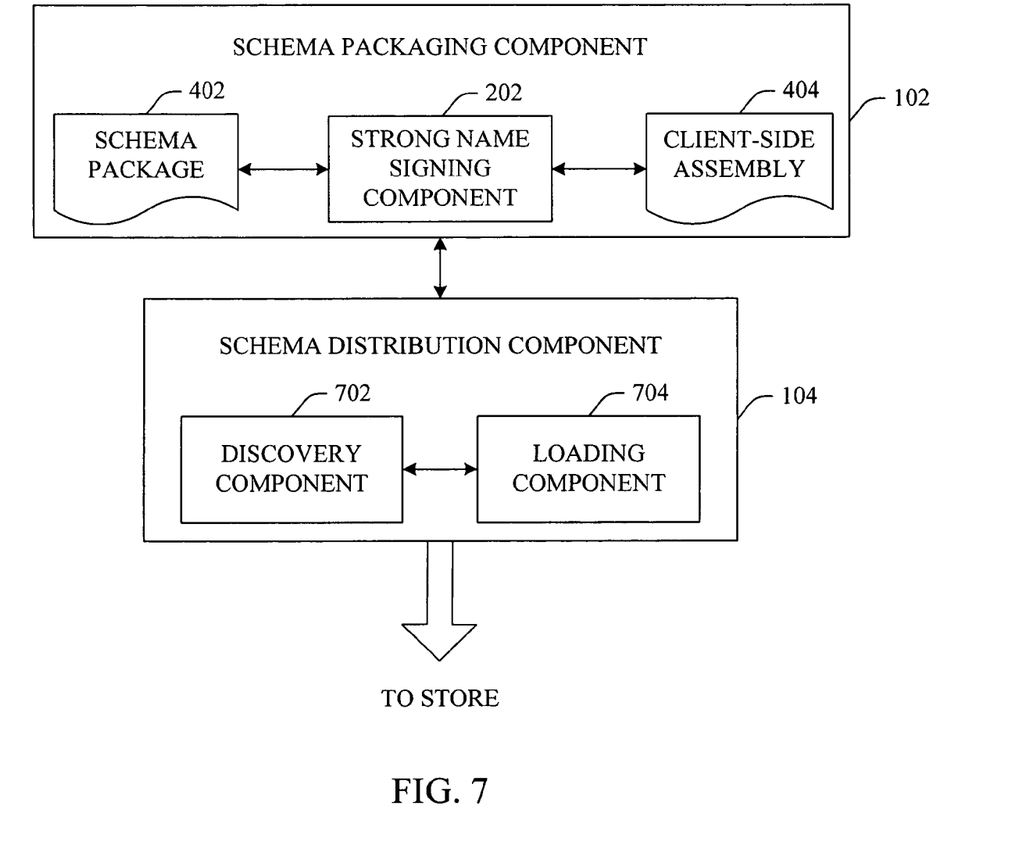
FIG. 7 illustrates a block diagram of a system that employs a discovery component and a loading component to effect distribution of a schema in accordance with an aspect of the innovation.

Turning now to FIG. 7 and continuing with a discussion of the schema packaging component 102, development of a file system (e.g., WinFS-brand) schema includes development of both a client-side assembly and a schema package. In order to effect compatibility, in one aspect, both the client-side assembly 404 and the schema package 402 can be signed by the signing component 202 by employing the same strong-name prior to deployment. In alternative aspects, development tools (e.g., discovery component 702 and loading component 704) can be employed to discover key pairs and sign packages both at compile time and post-compile time (delay signing). It is to be understood that delay signing environments can be supported by infrastructure for skip-list maintenance and querying.

Following is a discussion that suggests that the schema package 402 and client-side assembly 404 are signed by a particular and common key. In order to guarantee the relationship between the client-side assembly 404 and the schema package 402, the subject innovation discloses a novel relationship by requiring a signature of the client-side assembly using the same key (e.g., via strong name signing component 202). This use of the same key can effect an intrinsic relationship between the client-side assembly 404 and the schema package 402. This key indicates that the author must have had access to the private key which confirms that since only the author would have access to the private key, the schema package 402 is authoritative with respect to the client-side assembly 404.

As stated above, one novel feature of the subject mechanism(s) is that the schema package 402 can be included as a resource in the client side assembly 404. Including the schema package 402 in the client-side assembly 404 can guarantee that the schema package will be available for signing whenever the client-side assembly 404 is signed. In another aspect, the key pair can be presented through a single mechanism to the development tools.

During compile-time signing, the same key-file used to sign the assembly can be used to sign the schema package during assembly compilation. Because the schema package appears as a resource inside the assembly, the schema package can be signed first; included in the assembly; and then the assembly is signed. It is to be appreciated that these operations can be wrapped in custom build tasks (e.g., using MSBuild-brand task). Additionally, a user interface (UI) layer can be provided that simplifies the user's experience by automating a number of the acts described above.

Because private keys are very protected, in a development environment, a skip list can be used to effectuate delay signing. During delay signing, the schema packaging component 102 can support delay signed packages (i.e., a package that is constructed without the correct hash value). A skip list can be available to describe schema package skip list entries. By way of example, the skip list can be the assembly skip list of another similar mechanism. In accordance with this aspect, any schema packages that appear in the skip list are not validated during installation.

In this environment, although developers do not have access to the private keys, they can still work with the system as if they did have access to the private keys. Once development has been completed, a final signing process can be performed thereby signing the client-side assembly and the schema package with the key.

It will be appreciated that a skip list is a mechanism that enables by passing the strong name check that validates an assembly, schema or both on a particular machine. In other words, a skip list enables the scenario where, if the user sees this component, it can ignore the fact that it has not been signed with the appropriate private key.

In a delay sign development environment and when the assembly is finally signed, it can still be necessary to fully sign the schema package before the assembly is signed. In a development environment, where a separate department manages keys and performs the completion step of signing of an already built assembly, schema packages and their assemblies are frequently signed in a two step process. In the first step, a schema package is submitted to the signing department for signing. Accordingly, the signed package will be checked into the build tree. This checked-in signed package can be updated with a new signed package whenever schema changes are checked in.

The checked-in signed schema package can be used in subsequent builds. "Golden Bits" builds will subsequently be sent to the signing department for assembly signing already containing the signed schema package. In an alternative aspect, [0]this process can also be effected in a one step process. For example, an assembly submitted to the signing department could already contain delay-signed, but not fully signed, schema package(s) as a resource(s). In accordance therewith, the signing department could use a tool to extract the schema packages, sign them, re-insert them signed into the assembly, and finally sign the assembly.

Turning now to a discussion of where the client side assembly is stored and how it is loadable together with the schema package, FIG. 7 illustrates a system 700 having a discovery component 702 and a loading component 704 integral to the schema distribution component 104. The novel functionality of each of these components will be described in greater detail below.

Whenever a client application instantiates an instance of a schematized type for persistence in a store, the client may have to present the schema package to the store prior to presenting the data, for example, in the case where the necessary schema is not already available in the store. To present the schema package, the client must be able to discover and load the schema package.

With reference to the loading component 704, two types of mechanisms that can be employed: static and dynamic binding. However, the schema package must first be located (e.g., discovered) before persisting into a store. Accordingly, the discovery component 702 can be employed to locate the client-side assembly and/or the package in a global access cache (GAC) or local store or local file system. In other words, in exemplary aspects, there can be two choices as to where a user can deploy an application—GAC or local. A determining factor of the location can be how many users will be exposed to the application. As well, there are two choices as to how to code an application against a particular type. Each of these scenarios will be described below.

The first choice for deployment is GAC which means that the assembly will be exposed to all users all of the time. The GAC or global assembly cache is a global resource where an application (or part thereof) can be deployed thus allowing all users to access and use the application (or part thereof). The second choice is Local which means that the application (or part thereof) is saved in a particular location and limited to a single user (or finite group of users) with respect to access and use.

With respect to coding, there are two choice available, static and dynamic binding. If a user knows about the types and writes code against the known types explicitly, this is referred to as static binding. On the other hand, dynamic binding refers to the situation where a user does not know about specific types but, when the code is running, the system (e.g., via discovery component 702) can be queried to discover specific types. Once discovered, the user can program against the types dynamically.

The following table illustrates that the novel functionality of the discovery component 702 and loading component 704 are applicable to any cross section of these two decisions.

|  | Static Binding | Dynamic Binding |
|---|---|---|
| GAC | An application whose assemblies are installed in the GAC by an administrator and which statically binds to all types at compile time. | An application whose assemblies are installed in the GAC by an administrator and which discovers types dynamically or programmatically at runtime. |
| Local | An application whose assemblies are installed in the file system by a non-administrator and which statically binds to all types at compile time. | An application whose assemblies are installed in the file system by a non-administrator and which discovers types dynamically or programmatically at runtime. |

It will be appreciated that when code developed on a common language runtime (CLR) platform is to be shared by several applications across a computer, the code can often be placed in a machine-wide cache referred to as the GAC. Assemblies residing in the GAC must adhere to a specific versioning scheme which allows for side-by-side execution of different code versions.

In this aspect, the GAC-installed application has the requirement to deploy both client side assemblies and schema packages in a safe, machine global manner. It is to be understood that the CLR can provide services to satisfy this requirement in the form of the GAC and its installation services. It is further to be understood and appreciated that these services would have to be duplicated for schema packages if the GAC is not employed.

With reference to another aspect, the local application installs its assemblies in a well known location. The schema package for such applications can in theory be placed in the same location. In practice, however, it will be understood that an application can be built from a series of different components. Each component itself can be installed in one or more well known locations. Complex binding rules can exist in the CLR to facilitate the discovery and loading of these assemblies from these multiple locations in a particularly seamless manner. It will be understood that this binding infrastructure would have to be duplicated for schema packages if the existing infrastructure cannot be leveraged.

Static bound applications instantiate classes at compile time, i.e., they contain an explicit line of code that declares a variable of the specific class and uses the new operator to create a fresh instance of that class. For these classes the specific type bindings are resolved at link time to a fully-qualified, strong-named assembly which is later loaded (subject to fusion loading policy). Static applications are bound to a specific set of schema packages at the time they are bound to a specific set of assemblies, i.e., at link time.

On the other hand, dynamic bound applications link a routine or object at runtime based on the conditions at that moment. Dynamic applications load types dynamically as a result of user initiated discovery. For example, the Visual Studio-brand application allows user selection of assemblies that contain controls during the form design phase. In this example, the assemblies are loaded and then the controls can be instantiated through the control toolbar.

As well, dynamic applications can oftentimes load types programmatically. By way of example, the Word-brand application can maintain a list of registered Add-Ins. Each Add-In can then be loaded programmatically from the list and thereafter instantiated.

In operation, dynamic applications are bound to a specific set of schema packages only at runtime. Moreover, this set of schema packages can always be fluid from run to run and over time in the same run. In both types of applications, e.g., static or dynamic, the schema package for a type must be discoverable in all circumstances where the client-side assembly is discoverable. This is a novel feature of the subject mechanism(s). In other words, it is a novel feature of the subject innovation to include the schema package in the client-side assembly thereby guaranteeing that exactly the same infrastructure used to discover the assembly will be leverageable in discovery of the schema packages.

For correct operation, an application must deploy the client-side assembly and schema package for all types it expects to instantiate. Installation and deployment infrastructure can deploy assemblies both to the GAC and locally. It is to be understood that failure to deploy the schema package for an application would result in failure of the application in cross-level versioning scenarios, i.e., scenarios where instances are to be persisted into stores that do not have the required schema.

Because of the forward-looking nature and complexity/expense involved, cross-level versioning scenarios are sometimes rarely tested sufficiently prior to software shipping. If the software development process does not enforce the requirements for cross-level versioning scenarios at design time, these requirements may be overlooked during testing and deployment resulting in software failure in the field for untested scenarios. As such, it is a design requirement that the software development process enforce enough constraints at design time that deployment for these scenarios using infrastructure provided herein can be made easy and error free. Including the schema package in the client-side assembly guarantees that exactly the same infrastructure for deployment of the assembly will be leverageable for deployment of the schema package. It will be appreciated that developers and deployment tools are most often familiar with the issues presented by assembly deployment. Including a development time check can guarantee that the schema package has been properly compiled into a client side assembly as a resource. A run time check would also be beneficial for similar reasons.

In alternative aspects and as discussed above, multiple schema packages can be included within a client-side assembly. Accordingly, with respect to resource naming, the schema package that corresponds to any particular schema can be identified by a one-to-one mapping to a resource name that is based on the strong name used for the particular schema package.

It is to be appreciated that in multiple schema package scenarios, the matching and signing properties will still be met in order to effectuate the relationship between the client-side assembly and the schema packages. In other words, even if multiple schema packages exist with different strong names, they can all be signed by the same key to retain the relationship between the client-side assembly and the schema(s)—only one key can be used to sign the assembly.

As stated earlier, optionally, compression, encryption and authenticode signing can be employed with respect to alternative aspects. Because schema files can be large in size, compression is often employed to assist in manageability of the file size. In alternative aspects, compression can be applied before or after schema is signed. Applying compression after signing the schema can be particularly favored for at least two reasons. First, the hash is usually performed on the original XML content. Second, better compression can be usually be achieved because, due to the timing, the signature block is compressed as well. During schema verification, the schema package is first decompressed and then verified.

In accordance with an alternate aspect, the schema package can be a satellite assembly. In this approach, the schema is not directly embedded in client-side assembly. Rather, the schema is a separate satellite assembly as a manifest resource. The signing process is that both the main assembly and satellite assembly can be submitted to a signing department, which first signs the schema file and then signs the main assembly which hashes over the satellite assembly.

In another alternative aspect, the schema package could be maintained as a separate file. The schema package itself would be created as a separate build step by the developer, deployed as a separate file by the installer, and discovered separately by loader/binder. The development process could potentially suffer because separate steps would need to be performed by the developer which could be made seamless in the invention described. Moreover, the deployment process of this aspect could suffer because it would require extra steps that could become out of sync. Such a mismatch or neglect of proper deployment of the schema package could result in partial failure of the application, often in scenarios that may not be tested adequately before shipping. The discovery process would require additional infrastructure to address the problems of global deployment and dynamic discovery. These alternative aspects are to be considered within the scope of this disclosure and claims appended hereto.

As described supra, any public/private cryptographic key pair can be employed in accordance with the systems described supra. In one example, a public key cryptography technique can be employed to name (and sign) the schema package. Public key cryptography can refer to a cryptographic method that uses a two-part key (e.g., unique code) that includes a public and private component. In order to encrypt messages, the unpublished private key known only to the sender is used. Accordingly, to decrypt the messages, the recipients use the published public key of the sender. In other words, the public key can refer to the published part of a two-part, public key cryptography system.

The private part of the key pair is known only to the owner. Accordingly, a schema author can use the unpublished private key to cryptographically sign the schema package. This cryptographic security method can greatly enhance authenticity and integrity of the schema information. It should also be understood that any method of uniquely naming and/or signing data can be employed without departing from the spirit and scope of the invention and claims appended hereto.

Figure 8:
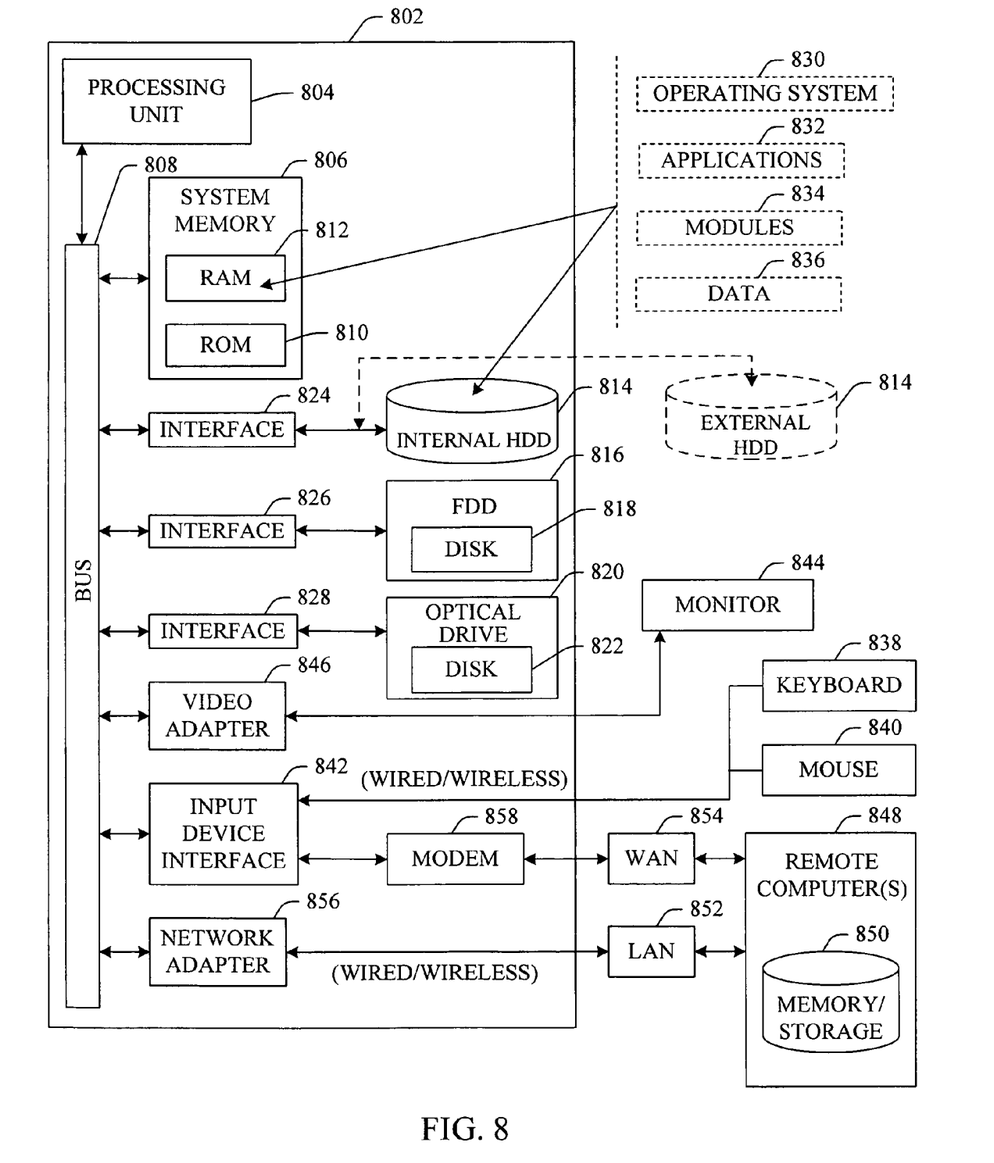
FIG. 8 illustrates a block diagram of a computer operable to execute the disclosed architecture.

Referring now to FIG. 8, there is illustrated a block diagram of a computer operable to execute the disclosed architecture of schema packaging, distribution and availability. In order to provide additional context for various aspects of the subject invention, FIG. 8 and the following discussion are intended to provide a brief, general description of a suitable computing environment 800 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects of the invention includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a nonvolatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the invention can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
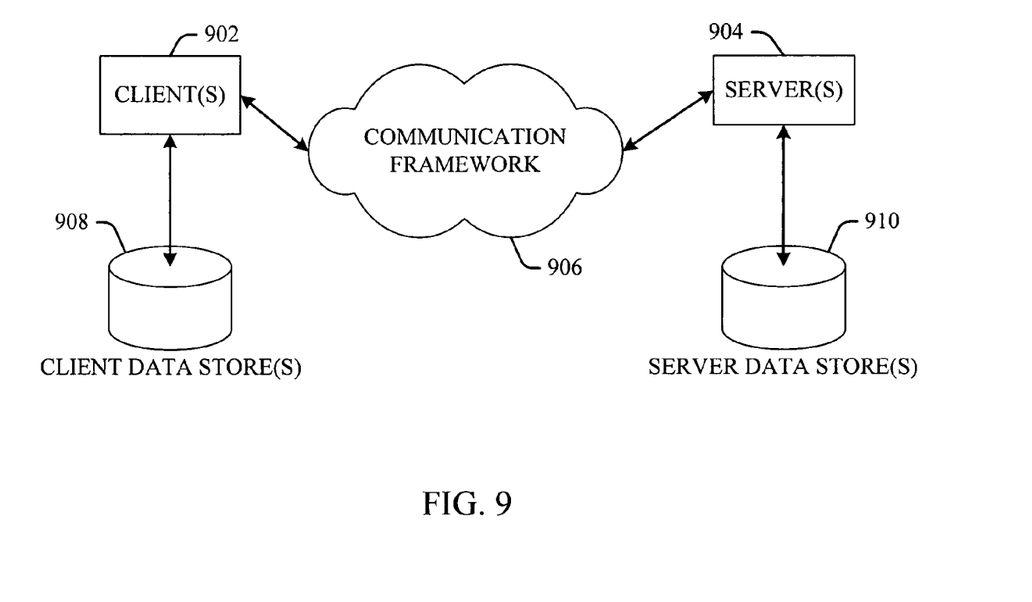
FIG. 9 illustrates a schematic block diagram of an exemplary computing environment in accordance with the subject invention.

Referring now to FIG. 9, there is illustrated a schematic block diagram of an exemplary computing environment 900 in accordance with the subject schema packaging, distribution and availability system. The system 900 includes one or more client(s) 902. The client(s) 902 can be hardware and/or software (e.g., threads, processes, computing devices). The client(s) 902 can house cookie(s) and/or associated contextual information by employing the invention, for example.

The system 900 also includes one or more server(s) 904. The server(s) 904 can also be hardware and/or software (e.g., threads, processes, computing devices). The servers 904 can house threads to perform transformations by employing the invention, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied on a computer-readable storage medium that facilitates availability of a schema, comprising:
   a packaging component that generates a schema package defining the schema, the packaging component signs the schema package and a client-side assembly with a cryptographic key and includes the schema package as a resource in the client-side assembly; and
   a distribution component that, upon execution on a client machine running the client-side assembly, discovers the schema package and facilitates availability of the schema to the client-side assembly when the client-side assembly instantiates an instance of a schematized type defined by the schema.

2. The system of claim 1, the packaging component creates an intrinsic relationship between the schema package and a client-side assembly using the cryptographic key, the intrinsic relationship allows the client-side assembly to discover and access the schema package.

3. The system of claim 2, the schema package is a schema definition language (SDL) document.

4. The system of claim 2, the packaging component deploys the signed schema package as a satellite assembly with regard to the client-side assembly.

5. The system of claim 2, the packaging component deploys the signed schema package as a separate file from the client-side assembly.

6. The system of claim 2, the distribution component comprises:
   a discovery component that facilitates location of the schema package by the client-side assembly based at least in part upon the intrinsic relationship between the schema package and the client-side assembly; and
   a loading component that facilitates access to the schema package by the client-side assembly.

7. The system of claim 2, the packaging component signs the schema package and the client-side assembly using a common cryptographic key.

8. The system of claim 2, further comprising an authenticode component that associates the signed schema package with at least one of an individual and an organization.

9. The system of claim 2, further comprising a compression component that compresses the signed schema package component and decreases transmission overhead of the schema package.

10. The system of claim 2, further comprising an encryption component that facilitates encryption of the signed schema package.

11. A computer-implemented method of distributing a schema, comprising:
 generating a schema package that defines the schema;
 signing a schema package with a cryptographic key;
 signing a client-side assembly with the cryptographic key;
 creating an intrinsic relationship between the client-side assembly and the schema package based on the cryptographic key signatures that facilitates discovery of the schema package by the client-side assembly; and
 distributing the schema package as an embedded resource in the client-side assembly based at least in part upon the cryptographic key.

12. The computer-implemented method of claim 11, further comprising embedding the signed schema package as a resource in the client-side assembly.

13. The computer-implemented method of claim 11, further comprising designating the schema package as a satellite assembly with respect to the client-side assembly.

14. The computer-implemented method of claim 11, further comprising generating a separate file from the schema package and relating the separate file to the client-side assembly.

15. The computer-implemented method of claim 11, the act of distributing further comprises:
 discovering the schema package based at least in part upon the cryptographic key; and
 loading the schema package for use by the client-side assembly.

16. The computer-implemented method of claim 11, further comprising associating the schema package to at least one of a specific individual and an organization.

17. The computer-implemented method of claim 11, further comprising compressing the schema package prior to the act of distributing.

18. The computer-implemented method of claim 11, further comprising, encrypting the schema package prior to the act of distributing.

19. A system embodied on a computer-readable storage medium that facilitates distribution of a schema package, comprising:
 means for generating a schema package defining a schema;
 means for signing the schema package with a cryptographic key;
 means for signing a client-side assembly with the cryptographic key;
 means for establishing an intrinsic relationship between the schema package and the client-side assembly based on the cryptographic key signatures that facilitates discovery of the schema package by the client-side assembly;
 means for embedding the schema package into the client-side assembly as a resource of the client-side assembly;
 means for distributing the schema package together with the client-side assembly; and
 means for automatically discovering the schema package for use by the client-side assembly when the client-side assembly instantiates an instance of a schematized type defined by the schema.

20. The system of claim 19, further comprising means for automatically accessing the schema package upon instantiation by the client-side assembly of a schematized type included within the schema package.

* * * * *